A. G. SNELL.
Clasp or Fastening for Carriage-Boots.

No. 213,256. Patented Mar. 11, 1879.

Witnesses.

Adolphus G. Snell
Inventor,
By atty.

UNITED STATES PATENT OFFICE.

ADOLPHUS G. SNELL, OF NEW HAVEN, CONNECTICUT.

IMPROVEMENT IN CLASPS OR FASTENINGS FOR CARRIAGE-BOOTS.

Specification forming part of Letters Patent No. 213,256, dated March 11, 1879; application filed January 28, 1879.

*To all whom it may concern:*

Be it known that I, ADOLPHUS G. SNELL, of New Haven, in the county of New Haven and State of Connecticut, have invented a new Improvement in Clasps or Fastenings for Carriage-Boots; and I do hereby declare the following, when taken in connection with the accompanying drawings and the letters of reference marked thereon, to be a full, clear, and exact description of the same, and which said drawings constitute part of this specification, and represent, in—

Figure 1:
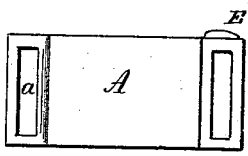
Figure 3:
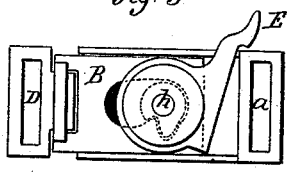
Figure 2:
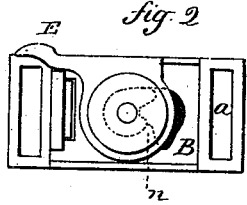
Figure 4:
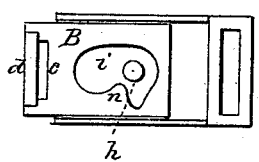
Figure 5:
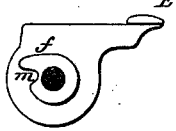
Figure 6:

Figure 1, a front view; Fig. 2, a rear view, locked; Fig. 3, a rear view, unlocked; Fig. 4, a rear view, cam removed; Fig. 5, the cam detached; Fig. 6, a longitudinal section.

This invention relates to an improvement in the device used in carriages to secure the boot, and commonly known as "boot-hooks;" and it consists in the construction hereinafter described, and more particularly recited in the claims.

A represents the plate or case, provided at one end with a loop, $a$, to be attached to the standing strap or apron, and is constructed with a recess upon the back side to receive a sliding plate, B. This plate B is constructed with a slot, $c$, at one end, forming a loop, $d$, to which a hook-loop, D, is attached, this loop D being made fast to the end of the other strap; or the order of attachment may be reversed.

The plate B is moved longitudinally out of the case, as shown in Fig. 3, to make the engagement, and as also shown in broken lines, Fig. 6. The hooked loop D is then engaged with the loop $d$, and the plate B drawn back into the case, brings the hook part of the loop D beneath the plate A, or within the case, or so as to prevent the hook from being detached while in that closed condition.

To thus move the plate B, a cam, $f$, is hung upon a pivot, $h$, with a handle, E, extending through a slot in one side of the case, and so that the cam may be turned on its pivot by moving the handle as from the position in Fig. 2 to that in Fig. 3 to unlock, and vice versa to lock. The cam $f$ works in a slot, $i$, in the plate B, a projection, $n$, in one side of the slot working into a notch, $m$, in the face of the cam, so that as the handle is turned from the position in Fig. 2 to that in Fig. 3 the sliding plate will be thrown out, as seen in Figs. 3 and 4, in which condition the loop may be removed from or attached to the slide. By turning the handle to the position shown in Fig. 2, the slide is drawn back and disengagement of the hook from the slide prevented, and when so drawn in the projection $n$ on the slide lies upon the concentric part of the face of the cam, so that the cam will resist any tendency of the hook to draw the plate outward.

It is preferable that the cam act directly upon the plate; but an intermediate link may be applied as a substitute for the direct connection described.

I claim—

1. The combination of the plate A, provided with means for attachment, the longitudinally-sliding plate B within said case, loop D, constructed for engagement with or disengagement from said plate B, and a cam provided with a handle for operating said cam, to give longitudinal movement to the said plate B, substantially as described.

2. The combination of the case, the longitudinally sliding plate arranged therein, and hook arranged to be attached to or disengaged from said plate, and a cam and handle arranged to impart longitudinal movement to the said plate, substantially as described.

ADOLPHUS G. SNELL.

Witnesses:
JOHN E. EARLE,
JOS. C. EARLE.